United States Patent [19]

Murray

[11] Patent Number: 4,800,962
[45] Date of Patent: Jan. 31, 1989

[54] PLANTER HYDRAULIC SYSTEM WITH MEANS FOR LOCKING ROW MARKERS DURING TRANSPORT

[75] Inventor: David L. Murray, Lee's Summit, Mo.

[73] Assignee: Deutz-Allis Corporation, Milwaukee, Wis.

[21] Appl. No.: 80,618

[22] Filed: Aug. 3, 1987

[51] Int. Cl.[4] ............................................. A01B 17/00
[52] U.S. Cl. .................................. 172/126; 172/130; 172/248
[58] Field of Search ............... 172/126, 130, 128, 248, 172/324, 625.2; 111/33; 280/415 R, 411 R, 411 A

[56] References Cited

U.S. PATENT DOCUMENTS 3,670,823  6/1972  Matthews et al. .................. 172/128
4,765,639  8/1988  Murray ........................... 172/625 X Primary Examiner—Brian S. Steinberger
Attorney, Agent, or Firm—Charles L. Schwab

[57] ABSTRACT

A wide farm implement is provided with a swingable tongue which permits endwise to and from fields. A pair of transport wheels are provided for supporting the implement for endwise transport and the support wheels, on which the implement is supported during a field working operation, are raised so as not to interfere with endwise transport. In order to prevent the automatic lowering of a row marker when the support wheels are thus raised relative to the frame, a blocking valve is provided in the row marker hydraulic circuit which moves to its closed position when the tongue is moved from its field working position thereby preventing lowering of the row marker.

5 Claims, 2 Drawing Sheets

PLANTER HYDRAULIC SYSTEM WITH MEANS FOR LOCKING ROW MARKERS DURING TRANSPORT

TECHNICAL FIELD

This invention relates to agricultural planters having row markers and more particularly to means for automatically preventing lowering of the row markers when the planter is being transported to and from the field.

PRIOR ART STATEMENT

U.S. Pat. No. 3,670,823 shows and describes a row crop planter having hydraulically operated support wheels and a pair of row markers operated by a hydraulic control system which includes a sequencing mechanism which alternately lowers the row markers. When the planter is raised on the support wheels at the end of a planting pass through a field, the down row marker is automatically raised and when the operator next lowers the planter into a planting position, the other marker will be automatically lowered through operation of the sequencing mechanism. The support wheel hydraulic circuit and the hydraulic circuit for operating the markers are connected in parallel to a main control valve.

OBJECTS AND SUMMARY OF THE INVENTION

It is a primary object of this invention to provide a mechanism which allows operation of the row markers of an implement when the implement tongue is in its field working position and which prevents lowering of the row markers when the implement tongue is moved from its field working position.

This invention is particularly useful in a wide implement having a laterally elongated frame on which ground engaging tools are mounted, support wheels for raising and lowering the implement frame, transport wheels which can be lowered for endwise transport of the implement, a swing hitch tongue pivotable between a field working position and an endwise transport position and a pair of row markers pivotally connected to laterally opposite ends, respectively, of the implement frame. The hydraulic actuators for raising and lowering the frame on the support wheels and the hydraulic actuators for raising and lowering the row markers are controlled through a pair of hydraulic circuits connected in parallel with a control valve. A blocking valve is placed in the circuit for the hydraulic actuators controlling the row markers and a valve operating mechanism automatically causes the flow control element of the blocking valve to be in an open position when the tongue is in its field working position and causes the flow control element to be in a closed position when the tongue is in its endwise transport position.

In the preferred embodiment of the invention, a double acting hydraulic jack for swinging the tongue has its opposite ends pivotally connected to the tongue and the frame, respectively, and is operable to move the tongue from its field working position to its endwise transport position. The blocking valve may be mounted on the jack controlling the position of the tongue.

BRIEF DESCRIPTION OF THE DRAWINGS

One embodiment of the invention is shown in the drawings in which.

DETAILED DESCRIPTION OF THE DRAWINGS

Figure 1:
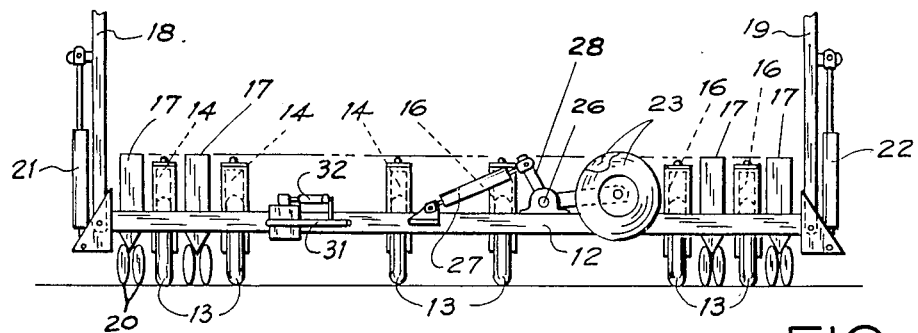
FIG. 1 is a front view of a towed agricultural implement with parts broken away for illustration purposes.

The towed implement in FIG. 1 includes a laterally elongated frame 12 which can be raised and lowered relative to the ground by six support wheels 13 which are movably mounted on the frame. Three of the support wheels 13 support one lateral half of the frame and are raised and lowered by master actuators or rams 14, and the other three wheels supporting the other lateral half of the frame are raised and lowered by slave actuators or rams 16.

Figure 4:
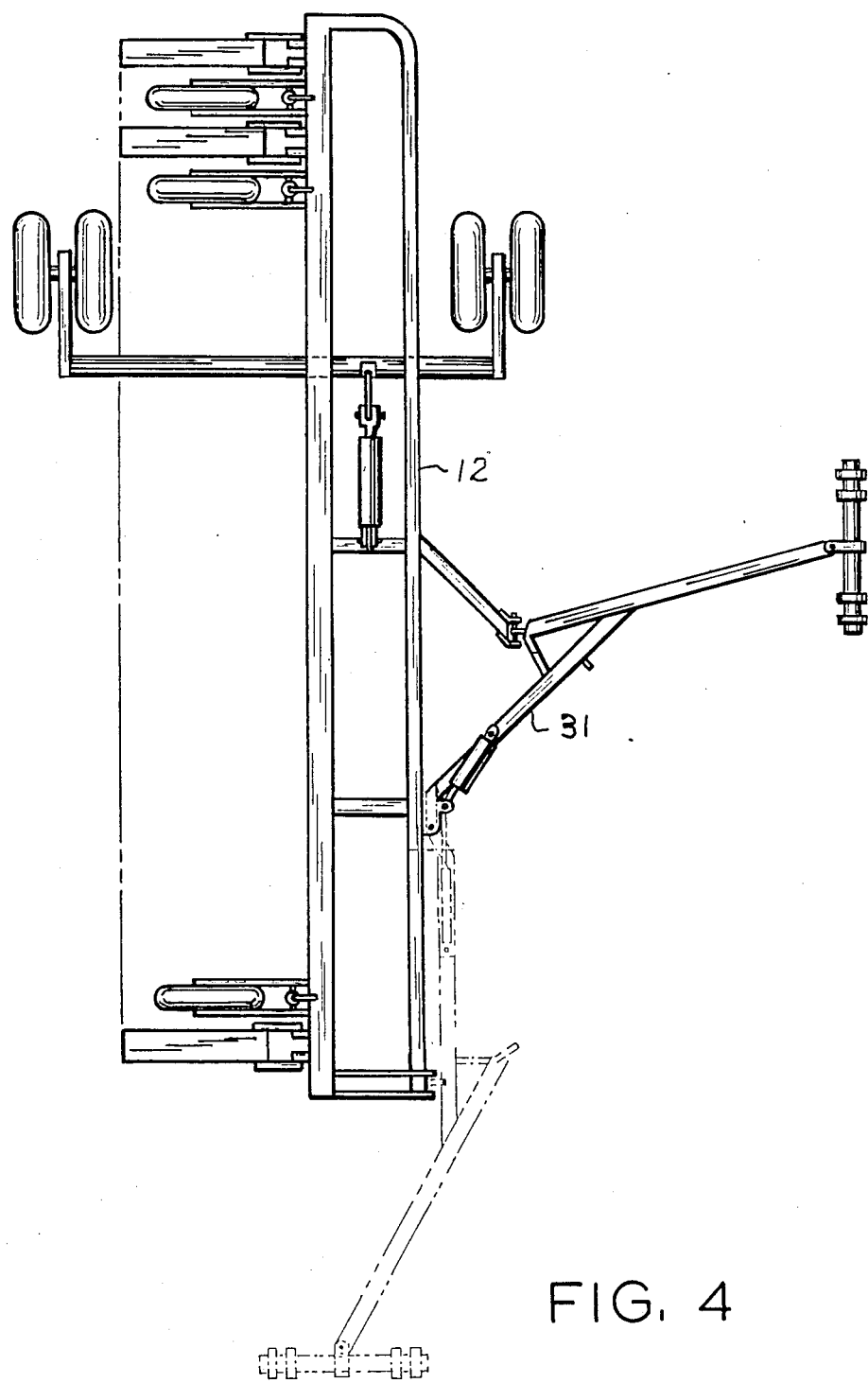
FIG. 4 is a top view of a planter.

Although the invention can be used in various agricultural implements designed to make sequential side by side passes through a field, the illustrated implement is a row crop planter with a plurality of equally spaced planter row units 17 having ground engaging tools 20. When the frame 12 is raised by full extension of the double acting rams 14, 16, the planter row units 17 are raised from the ground. A pair of row markers 18, 19 are pivotally mounted at opposite ends, respectively, of the frame 12 and are alternately raised and lowered between their lowered row marking position and their illustrated raised position by hydraulic actuators 21, 22. The illustrated planter is very wide and therefore it is transported endwise when moved to and from the field. To facilitate endwise transport, a pair of transport wheels 23 are rotatably mounted on arms secured to a rock shaft 26. Extension and contraction of a double acting hydraulic jack 27 pivotally connected at its opposite ends to the frame 12 and an arm 28 secured to the rock shaft 27 causes the transport wheels 23 to be lowered and raised, respectively, relative to the frame 12. A tongue 31, only a portion of which is illustrated, is pivotally connected to the frame 12 and is swingable from a field working position to an endwise transport position by a double acting hydraulic jack 32. The illustrated planter is similar to that shown and described in my U.S. patent application Ser. No. 039,928, filed Apr. 20, 1987, for an Implement Swing Hitch Permitting Endwise Transport, issued Aug. 23, 1988 as U.S. Pat. No. 4,765,639, the description of which is incorporated herein by reference. The planter shown in FIG. 4 of the drawings is substantially identical to FIG. 1 of U.S. Pat. No. 4,765,639. FIG. 4 shows a swing hitch tongue 31 having a rear end pivotally connected to a frame 12 and a front end adapted for connection to a towing tractor. The tongue is pivotable between its field working position shown in solid lines and an endwise transport position, shown in broken lines, in which the planter is transportable endwise.

Figure 2:
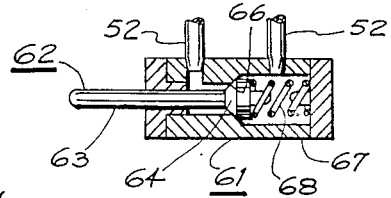
FIG. 2 is a section view of a blocking valve.
Figure 3:
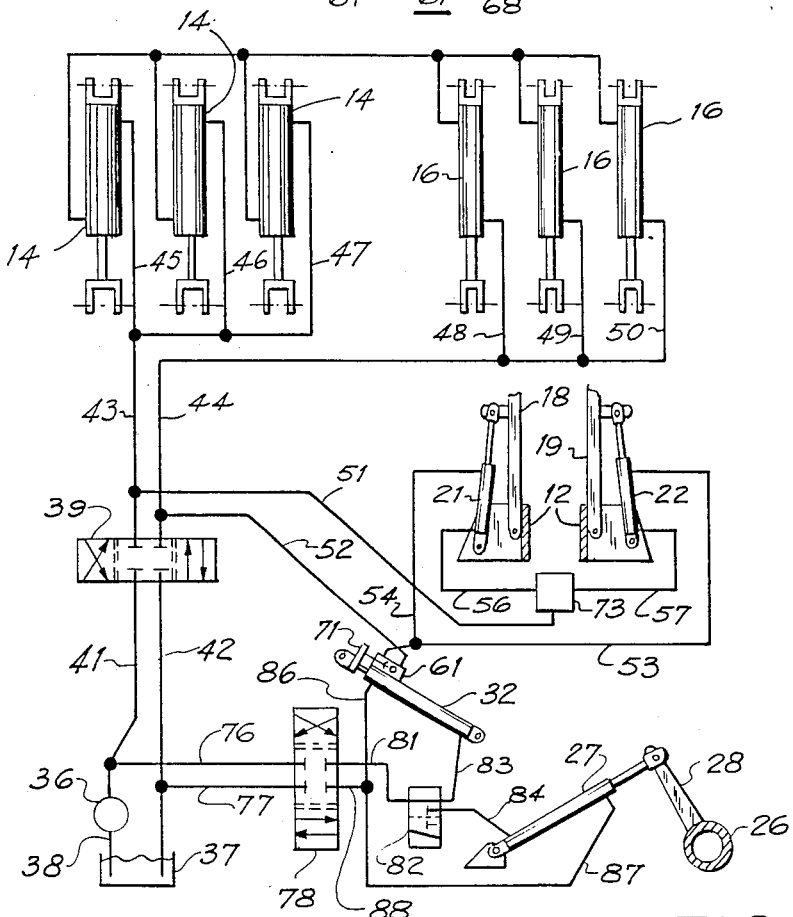
FIG. 3 is a schematic of a hydraulic control system for the implement illustrated in FIG. 1.

Referring also to FIGS. 2 and 3, a hydraulic control system is provided for the hydraulic rams 14, 16, hydraulic actuators 21, 22 and hydraulic jacks 27, 32. A pump 36 is connected in fluid receiving relation to a reservoir 37 by a conduit 38 and delivers pressure fluid to a control valve 39 via a delivery conduit 41. A return conduit 42 connects the valve 39 to the reservoir 37. A first circuit including main conduits 43, 44 and branch conduits 45, 46, 47, 48, 49, 50 connect the rams 14, 16 to the control valve and it will be noted that within the first circuit the set of three parallel connected rams 14 and the set of three parallel connected rams 16 are connected in series so as to provide a master/slave relationship. A second hydraulic circuit includes fluid conduits 51, 52 and branch conduits 53, 54, 56, 57 for supplying pressure fluid to the double acting hydraulic actuators 21, 22 interconnected between the frame 12 and the row markers 18, 19. Fluid flowing in conduit 52 passes through, or is blocked by, a blocking valve 61 mounted on the cylinder component of the tongue operating jack 32. As shown in FIG. 2, a flow control element 62 of the blocking valve 61 includes an elongated stem 63 and a frusto-conical part 64 which seats on a conical seat in the valve housing 67. A coil compression spring 68 resiliently urges the reciprocatable valve element 62 toward its seated position illustrated in FIG. 2. In this seated position, the row markers 18, 19 cannot be moved. However, when the double acting jack 32 is contracted to swing the tongue 31 to its field working position, the stem 63 abuts a confronting abutment or flange 71 on the rod end of a piston component of the jack 32 forcing the valve element 62 off the seat 66 and thus shifting the flow control element 62 from its closed position to its open position in which fluid flow is permitted in conduit 52.

It will be noted that a single control valve 39 is used to operate both the support wheel rams 14, 16 and the row marker actuators 18, 19. A sequencing valve 73 at the junction of conduit 51 and branch conduits 56, 57 sequentially connects branch conduits 56, 57 to conduit 51 so as to cause the row markers to be alternately lowered. The tongue operating jack 32 and the transport wheels operating jack 27 are supplied fluid through a circuit including conduits 76, 77 connected to a control valve 78. One jack supply port of the control valve 78 is connected to the closed ends of the jacks 27, 32 through a conduit 81, a selector valve 82 and rams supply conduits 83, 84. Branch conduits 86, 87 connect the rod ends of the jacks 27, 32 to the valve 78 through a conduit 88 connected to the other jack support port of the valve 78. When the selector valve 82 is in its illustrated tongue operating position, flow in conduit 84 is blocked at the valve 82 and thus jack 27 will not expand or contract when conduit 87 is pressurized or connected to the reservoir through operation of valve 78 to contract or extend the jack 32 to move the tongue 31 between its contracted field working position and its extended endwise transport position in which the planter is transportable endwise.

OPERATION

When the conduits 43 and 51 are supplied pressure fluid, the planter frame 12 and planter units 17 will be raised on the support wheels 13 and the row markers 18, 19 will be moved to their raised position. When the frame 12 is lowered to a planting position, the sequencing valve will cause the row marker previously in a raised position will be lowered to a marking position in which an earth engaging element, such as a disc, on the end of the row marker arm will form a mark on the ground which the operator of the towing tractor will cause the tractor to follow on the next planting pass through the field. When the frame is raised at the end of the field prior to making a 180 degree turn for another pass through the field, the down marker will be raised and upon lowering the frame to resume planting the other marker will automatically be lowered to its marking position. The sequencing valve 73 per se is not a part of this invention and is a commercially available valve, part number 128,526, manufactured and sold by Cross Manufacturing Inc., 100 Factory Street, Lewis, Kans. 67552.

At the completion of a planting operation, the frame 12 is raised on the support wheels 13 by extending the jacks 14, 16. This will automatically cause both markers 18, 19 to be in their raised positions. The transport wheels 23 are then lowered to raise one end of the frame 12 so as to raise the support wheels 13 at that end of the frame off the ground with the other support wheels 13 supporting the other end of the frame. The tongue 31 is next pivoted to its endwise transport position by extending the jack 32. When the jack 32 is extended, the blocking valve 61 will shift under the biasing action of a resilient spring 68 to its closed position thereby automatically locking the row markers in their raised position. After the tongue has been placed in its endwise transport position, the support wheels 13 are raised so as not to interfere with endwise transport. Since the blocking valve 61 is closed, neither row marker will be lowered when the valve 39 is adjusted to raise the support wheels 13 relative to the frame. In summary, when the planter is raised on the support wheels 13 and the tongue 31 is then moved from its field working position, the row markers 18, 19 will automatically be locked against movement from their raised position. This prevents unintentional lowering of the markers during transport of the planter, thus preventing damage that might otherwise be incurred should the markers be permitted to be lowered.

The embodiments of the invention in which an exclusive property or privilege is claimed are defined as follows:

1. A wide agricultural implement having a laterally elongated frame, ground engaging tools depending from the frame, support wheels mounted on the frame movable between a frame lowered position in which the tools engage the ground and a frame raised position in which the tools are raised from the ground, transport wheels mounted on the frame for movement between a frame raised transport position in which the tools are raised from the ground and in which the implement may be transported in an endwise direction and a frame lowered position in which the transport wheels are raised from the ground, and a swing hitch tongue having a rear end pivotally connected to the frame and a front end adapted for connection to a towing tractor, said tongue being pivotable between a field working position and an endwise transport position in which said implement is transportable endwise, and further comprising hydraulic ram means interposed between said frame and said support wheels operable to move said wheels between said frame lowered and frame raised positions,
 a row marker pivotally connected to each of the laterally opposite ends of said frame,
 a double acting hydraulic actuator interconnected between each of said row row markers and said frame,
 a hydraulic control system including
  a fluid reservoir,
  a control valve,
  a pump connected in fluid receiving relation to said reservoir and in fluid delivery relation to said control valve,
  a first hydraulic circuit connecting said ram means to said control valve, a second hydraulic circuit connecting said actuators to said control valve, said second circuit being in parallel with said first circuit and a blocking valve in said second circuit including a flow control element shiftable between a closed position in which said second circuit is blocked and an open position in which fluid flow in said second circuit is permitted and a valve operating mechanism on said implement operatively associated with said flow control element automatically causing said flow control element to be in said open position when said tongue is in said first working position and to be in said closed position when said tongue is in said endwise transport position.

2. The implement of claim 1 and further comprising a double acting hydraulic jack having cylinder and piston components pivotally connected to said tongue and frame, respectively, wherein said blocking valve includes a housing mounted on one of said components, said flow control element is shiftably mounted in said housing and has a stem portion extending from said housing and said valve operating mechanism includes an abutment on the other of said components disposed in confronting relation to said stem portion of said flow control element.

3. The implement of claim 2 wherein a hydraulic jack is interposed between said transport wheels and said frame and further comprising a hydraulic control system for said jacks including a second control valve with a pair of jack supply ports, first conduits connecting one of the opposite ends of each of said jacks to one of said supply ports and second conduits connecting the other of the opposite ends of said jacks to the other of said supply ports, and a selector valve operatively associated with one of said first and second pair of conduits permitting selection of a single one of said jacks for operation in response to operation of said second control valve.

4. The implement of claim 1 wherein a double acting hydraulic jack is operatively interconnected between said tongue and said frame and wherein actuation of said jack to swing said tongue from said field working position toward said endwise transport position automatically causes said blocking valve to move to said closed position.

5. The implement of claim 4 wherein said blocking valve is mounted on said jack.

* * * * *

UNITED STATES PATENT AND TRADEMARK OFFICE
CERTIFICATE OF CORRECTION

PATENT NO. : 4,800,962
DATED : January 31, 1989
INVENTOR(S) : David L. Murray

It is certified that error appears in the above-identified patent and that said Letters Patent is hereby corrected as shown below:

Column 5, line 13, "first" should read "field".

Signed and Sealed this

Fourth Day of July, 1989

Attest:

DONALD J. QUIGG

*Attesting Officer*          *Commissioner of Patents and Trademarks*